May 31, 1949.  H. GISSER  2,471,423
TESTER FOR BEARINGS
Filed Oct. 30, 1946  2 Sheets-Sheet 1
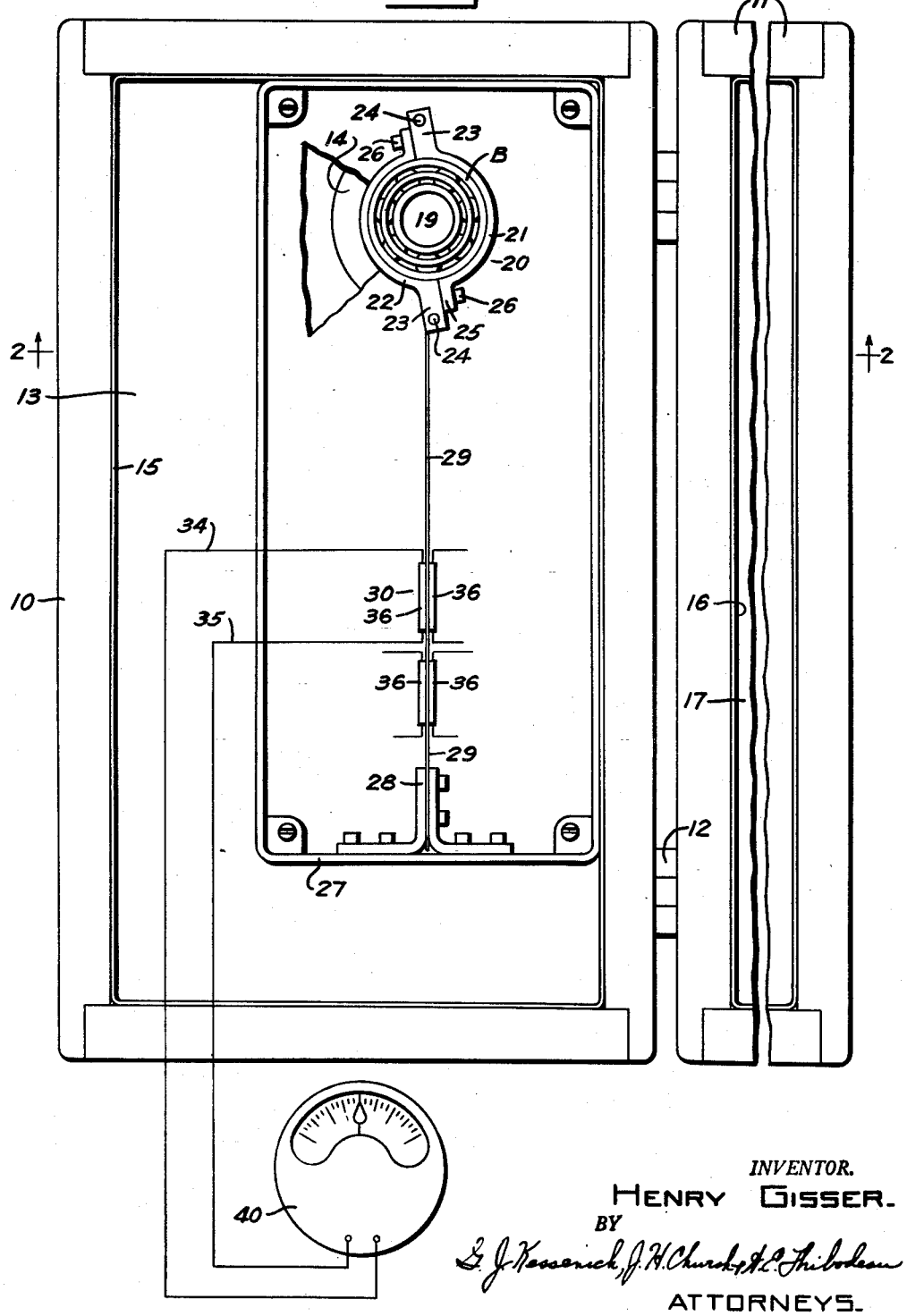
INVENTOR.
HENRY GISSER.
BY
ATTORNEYS.

May 31, 1949.  H. GISSER  2,471,423
TESTER FOR BEARINGS
Filed Oct. 30, 1946   2 Sheets-Sheet 2
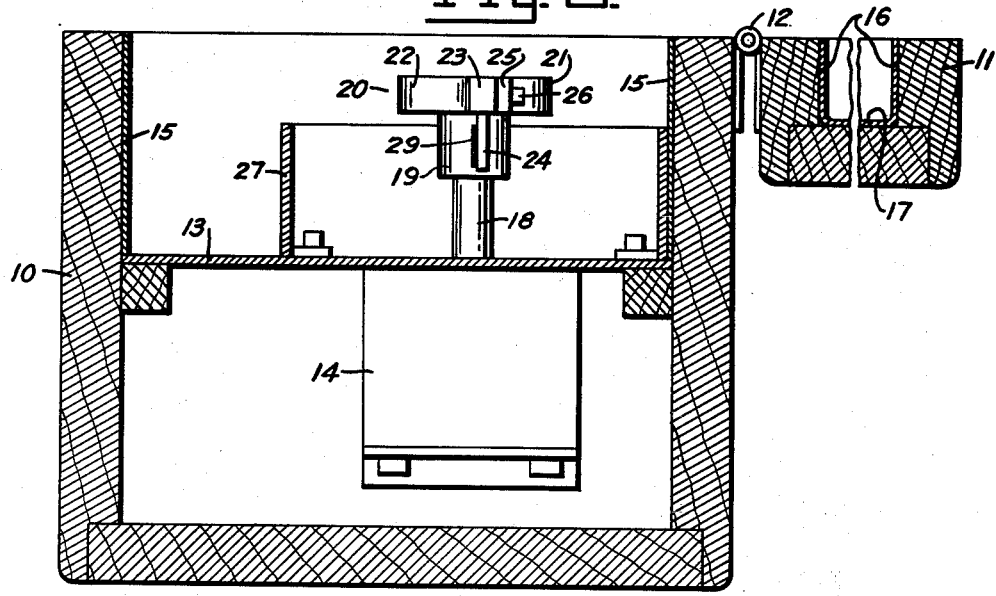
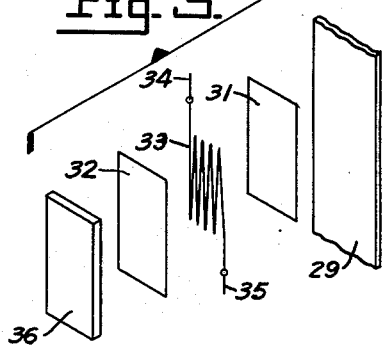
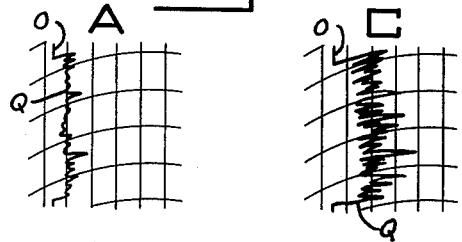
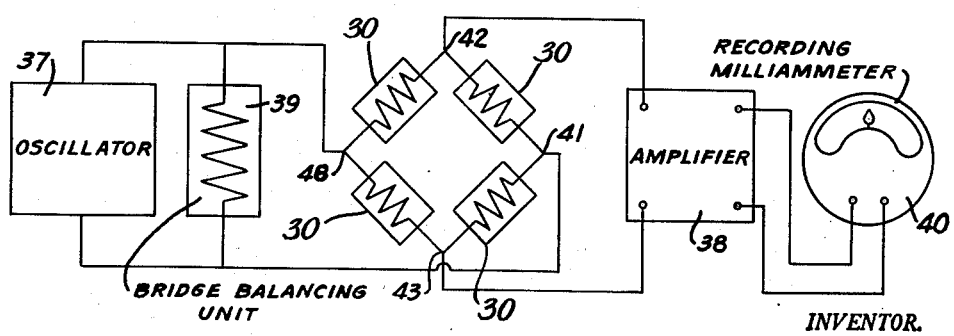
INVENTOR.
HENRY GISSER.
BY
ATTORNEYS.

Patented May 31, 1949

2,471,423

UNITED STATES PATENT OFFICE 2,471,423

TESTER FOR BEARINGS

Henry Gisser, Philadelphia, Pa.

Application October 30, 1946, Serial No. 706,790

3 Claims. (Cl. 73—9)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to a testing device. It has special relation to a test unit which will determine the frictional characteristics of precision, anti-friction bearings, such as ball or roller bearings, under suitable loads and speeds and to the determination of change in these frictional characteristics within the range over which the bearing is still serviceable.

One specific use to which this device has been put is to test ball bearings for synchronous units, such as "Selsyn" or "Autosyn" motors under small torques and at low speeds. The maximum torque under which such bearings must operate smoothly in service is of the order of 5 gram centimeters. The maximum torque for new bearings is much lower, being of the order of 1 g. cm., so as to allow for traces of corrosion during the assembly process, storage and use.

In the past, the method of testing such bearings, with which I am familiar, was to rotate them by hand or to assemble the bearings into the device in which they were used and to measure the angular error of such a unit. The procedure was quite cumbersome when many determinations were made. The errors increased enormously when a set of bearings was repeatedly assembled into a device in which it was used in order to study the time rate of changes during exposure to some deleterious condition. To use the actual units for which the bearings are intended for quantitative measurement of bearing friction is not entirely satisfactory because the angular errors obtained with new bearings are quite close to the maximum permissible angular error of the device in which the bearings are used. In addition, the use of a standard device containing bearings as a test device for the bearings automatically fixes all of the dimensions of the bearing under test. Laboratory test fixtures for bearings described in the literature involve measurement of wear and temperature increase at high loads and speeds. These are obviously not applicable to the present problem. Commercial torque meters cannot be used because they are not intended for the low torques involved.

Anti-friction bearings of the type to be tested by the device of this invention may become unserviceable before any corrosion or other change takes place that may be detected with the unaided eye.

The objects of this improved testing device for bearings are as follows:

To provide a test unit in which tests may be made in a short period of time.

To test bearings by a non-destructive method.

To increase the speed and decrease the labor with which bearings may be tested.

To safeguard the bearings against mechanical injury or accident during test.

To decrease the skill and effort that is required of the test operators.

The foregoing and other objects are attained by providing a bearing testing and recording machine of unique construction and superior performance. One preferred form of such a test device is shown in the accompanying drawings and described in the annexed specification wherein:

Fig. 1 is a diagrammatic and schematic view showing the top or plan view of the test unit with a part broken away to permit observation of the motor beneath it, and with the lid broken down the middle to permit the drawing to be made on an increased scale.

Fig. 2 is a vertical transverse cross section on line 2—2 of Fig. 1 viewed in the direction of the arrows.

Fig. 3 is an exploded perspective view of a portion of the spring and the strain gage mounted thereon.

Fig. 4 is a reproduction of a pair of records made by the test unit of this invention.

Fig. 5 is an electric circuit diagram with parts in block form showing the electrical connections.

One embodiment of the testing and recording device of this invention comprises a case or box 10, for which wood is a suitable material. Box 10 prevents difficulties due to even slight drafts or temporary changes in atmospheric temperature in the neighborhood of the test equipment. It renders the unit much more resistant to injury from shock or mishandling. Case or box 10 has a top or cover 11 connected thereto by means of hinges 12. Box 10 is divided into upper and lower compartments by an intermediate deck 13 of which a portion is broken away in Fig. 1 to disclose the motor 14 beneath it. Deck 13, together with the side walls 15 of box 10 and the side walls 16 and the top wall 17 of cover 11, may conveniently be made of metal so as to provide a shield for the strain responsive unit (to be hereinafter described) against electric disturbance by the motor 14 or other extraneous source.

Fig. 2 shows that motor 14 drives a shaft 18 which projects through the deck 13 into the upper compartment of box 10. At its upper end shaft 18 carries an adapter 19 upon which the inner race of the bearing B which is to be tested is mounted. The outer race of the bearing B has secured to it a head, generally indicated at 20. Head 20 is formed of two yoke or half-ring shaped members 21 and 22 which are duplicates since each has a projecting end 23 in which is carried a downwardly depending pin 24, and each has an opposite end 25 through which passes a screw 26 by means of which the head 20 is clamped firmly on the outer race of bearing B.

In the upper compartment of box 10 is secured a frame-shaped wall 27 suitably of metal. To wall 27 are secured two angles 28 between which is fixedly mounted one end of a spring 29. Spring 29 conveniently consists of a strip of metal, such as spring bronze, 4½ inches by ⅝ inch by 0.013 inch. Since the torques encountered in testing small bearings are very low, this spring must be quite thin in order to obtain appreciable strain. On the other hand, decreasing the thickness of the spring increases the sensitivity of the gage. At a spring thickness of 0.008 inch it is found that the lead wires (hereinafter to be described) are sufficiently stiff to cause maximum spring strain above the strain responsive units (to be later described). A more rigid mechanical system, resulting from the use of a thicker spring, is considered advisable to avoid damage in handling. It will be readily appreciated that, since spring 29 is easily detached from angles 28, a variety of springs may be each replaceably secured between the angles 28 so that the test unit has a wide range of use.

On the side of spring 29 is mounted a plurality of strain responsive units, generally indicated at 30, of which four are shown in Figs. 1 and 5 of the drawing. However, any convenient number of such gages, preferably four, may be used, connected in circuit as shown in Fig. 5 and described more fully later. The sensitivity of the test unit materially increases by the use of a greater number of strain responsive units.

Fig. 3 shows that each strain responsive unit 30 consists of sheets of paper 31 and 32 between which is cemented a fine wire 33 of appreciable resistance. To the ends of wire 33 are welded, or otherwise integrally secured, lead wires 34 and 35. A cover of flexible felt 36 overlies the outer side of the strain responsive unit 30 while the inner side is attached to the spring 29, conveniently by being cemented to spring 29 by a layer of "Duco" household cement or its equivalent. The cover 36 may be formed of a thin, flexible Vinylite sheet, but flexible felt is preferable. The lead wires 34 and 35 are best made of double-silk-covered, special flexible wire. Lead wires of No. 20 stranded hook-up wire with synthetic insulation were found to be sufficiently stiff to cause maximum spring strain above the strain responsive units where the spring 29 had a thickness of 0.008 inch.

A commercial SR-4 oscillator amplifier 37—38 and commercial resistance bridge balancing unit 39 (SR-4 single-channel), both obtained from the Instrument Division of the Baldwin Locomotive Works, Philadelphia, Pa., were connected to four strain responsive units connected in the form of a resistance bridge, as shown in Fig. 5. The oscillator 37 and the bridge balancing unit 39 were connected to two of the corners 48 and 41 of the resistance bridge formed of the strain responsive units. The opposite corners 42 and 43 were connected to the amplifier 38 and thence to a recording D. C. milliammeter 40 (Esterline-Angus 5 ma. D. C. range). Electrical input to the bridge circuit at points 48 and 41 is conveniently 6-12 volts either direct or alternating current depending upon the resistance of the strain responsive unit. (When A. C. is employed the oscillator amplifier mentioned above is utilized. When using D. C. the oscillator amplifier is replaced by a suitable battery and a suitable direct current amplifier.)

One mode of operating this testing and recording unit is as follows. The bearing B may be tested in a horizontal position, in which case Fig. 1 shows a top or plan view and Fig. 2 a vertical transverse cross section; or the bearing B may be tested in a vertical position, in which case Fig. 1 shows a front elevation and Fig. 2 a horizontal transverse cross section. In either case the bridge circuit shown in Fig. 5 is electrically balanced. The spring 29 is then calibrated by placing the unit so that the spring is horizontal with its smallest dimension vertical. A wire hook is suspended from the end of the spring. The weight of the spring and of the hook is counterbalanced with a sufficient weight to rebalance the bridge electrically. A series of different weights are then hung from the hook on the spring and the resulting current shown by the milliammeter 40 is recorded. The data thus secured are fitted to a straight line by the method of at least squares. One equation for this line was found to be:

$$I = 0.0016W - 0.0525$$

where I is the current in milliamperes and W is the weight in milligrams. It was found that the resulting calibration curve departs from linearity at weights of 800 mg., corresponding to currents greater than 1.25 ma. for the particular spring 29 used. When the spring 29 has been thus calibrated, a bearing B is tested by rotating it alternately, first counterclockwise and then clockwise, these rotations being repeated twice. The record made at one of these rotations by the milliammeter 40 is shown at A in Fig. 4. For the purpose of testing the sensitivity of the test unit itself, the bearing is then subjected to a salt spray for one hour after which it is re-tested. In most instances, the corrosion of the balls and races of bearing B is of such magnitude that it cannot be readily detected by rotating the bearing by hand. The results of one such re-test are shown in Fig. 4 at C. The zero lines O are drawn on the records, shown in Fig. 4, by hand after the curves Q have been recorded. From a comparison of the records of Fig. 4, as shown at A and C, it is readily apparent that the testing unit is sufficiently sensitive to indicate very small changes in the torque transmitted by an antifriction bearing, and to preserve records of the torque so transmitted so that comparisons between different bearings can be made. By suitable calibration of the test unit, selections can be made from large numbers of bearings of the same size.

I claim:

1. In an electrically-operated testing device for measuring the frictional torque of bearings, a support, a flexible spring mounted on said support, a power-operated shaft mounted on said support and carrying fixed to it one of the races of the bearing being tested, a head formed of two half ring-shaped members each having a projecting end and carrying a pin-shaped device so that the torque required to turn the bearing by said shaft is transmitted through the bearing being tested and causes deflection of said spring in one direction or the other by means of the pin-shaped device on the end of said head, and a plurality of strain responsive units mounted on opposite sides of said spring and caused to vary in electrical resistance by the deflection of said spring.

2. In a twist-measuring apparatus for antifriction bearings, a ring-shaped holder having a projection extending laterally therefrom and carrying a pin-shaped member, said holder being clampable upon the outer race of the bearing being tested and holding the race against rotation in the holder, a substantially flat strip of flexible metal constituting a spring lying generally in a plane passing through the axis of rotation of the bearing being tested and engaged by the pin-shaped member on the projection of said holder so that a portion of said spring strip is turned out of said plane upon rotation of said holder due to twist caused by the friction of the bearing being tested, and at least one variable-resistance strain-responsive unit mounted upon and actuated by the movement of said spring strip out of said plane.

3. A device for testing a small torque occurring at a low speed in an antifriction bearing, including, a casing in which the operative parts of the device are housed, a motor having a shaft for rotating the bearing, an elongated flexible spring having one end fixed in said housing and having its opposite end free and positioned adjacent said shaft so as to be engaged by a head carried by the bearing undergoing test which is mounted on the shaft, a strain responsive unit fastened to said spring so that flexure of the spring varies the resistance of the strain responsive unit, and an electric indicating circuit connected under the control of said strain responsive unit so as to indicate the variation of the resistance of said strain responsive unit.

HENRY GISSER.

REFERENCES CITED

The following references are of record in the file of this patent:

UNITED STATES PATENTS

| Number | Name | Date |
|---|---|---|
| 1,198,518 | Bowen | Sept. 19, 1916 |
| 2,019,948 | Boerlage | Nov. 5, 1935 |
| 2,045,555 | Almen | June 23, 1936 |
| 2,316,975 | Ruge | Apr. 20, 1943 |
| 2,350,072 | Simmons | May 30, 1944 |
| 2,363,181 | Howland | Nov. 21, 1944 |
| 2,370,606 | Morgan et al. | Feb. 27, 1945 |
| 2,403,952 | Ruge | July 16, 1946 |